United States Patent
Burrus

[15] 3,673,850
[45] July 4, 1972

[54] LIQUID LEVEL DETECTOR
[72] Inventor: Bill S. Burrus, Tulsa, Okla.
[73] Assignee: Combustion Engineering, Inc., New York, N.Y.
[22] Filed: Dec. 3, 1970
[21] Appl. No.: 94,758

[52] U.S. Cl. ............................................. 73/1 R, 73/304 C
[51] Int. Cl. ..................................................... G01f 25/00
[58] Field of Search ......................................... 73/1 R, 304 C

[56] References Cited
UNITED STATES PATENTS
3,060,717  10/1962  Howe ...................................... 73/1 R
3,181,342  5/1965  Barengoltz .............................. 73/1 R
3,394,590  7/1968  Napolitano ........................... 73/1 R X

*Primary Examiner*—Louis R. Prince
*Assistant Examiner*—Frederick Shoon
*Attorney*—Arthur L. Wade

[57] ABSTRACT

In the environment of a subsea storage tank for petroleum production, a primary element is mounted within a tube extended through the tank top to sense the oil-water interface within the tank. A pump and storage system is connected to the tube to alternately fill the tube with sea water and oil for calibration purposes.

3 Claims, 1 Drawing Figure

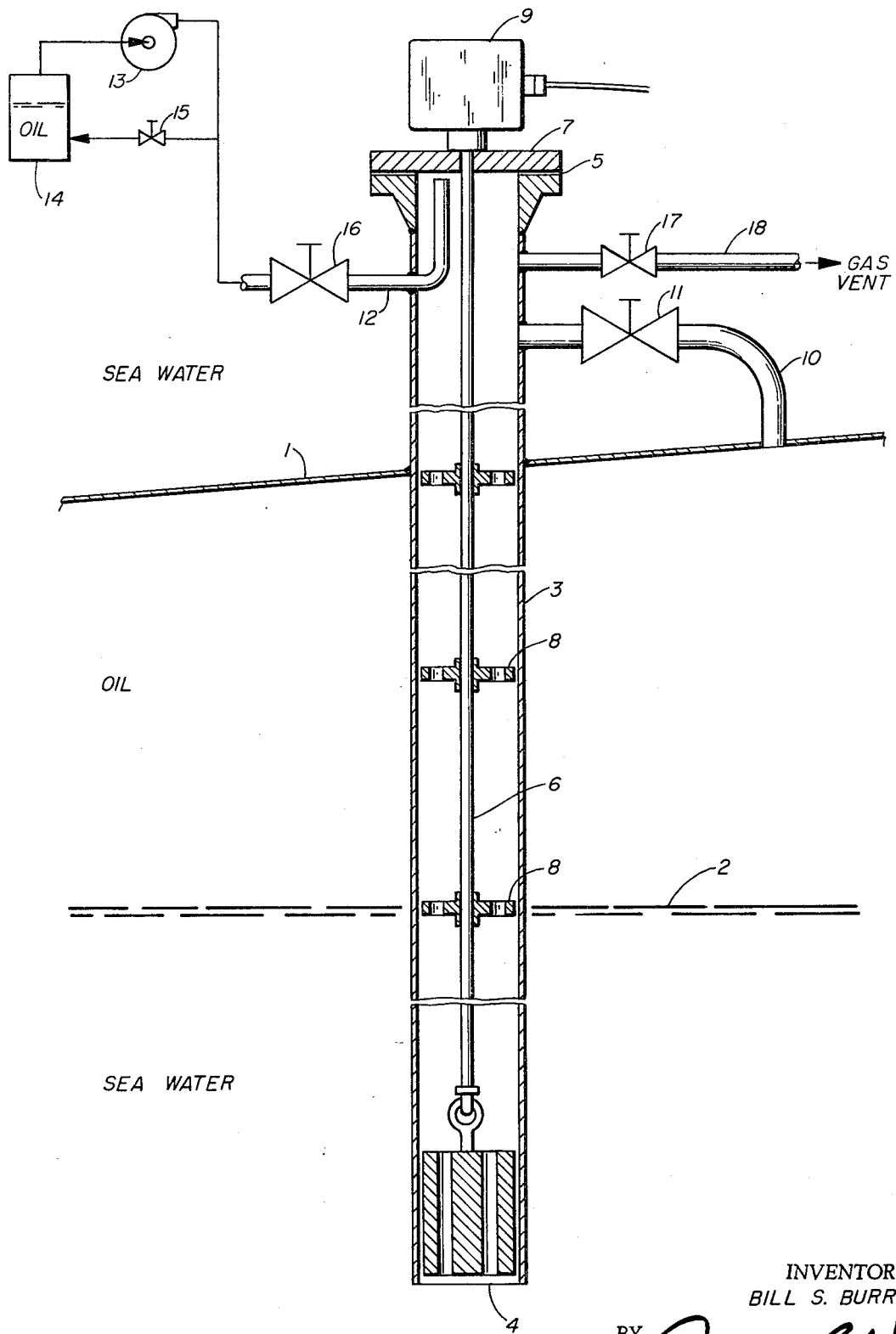
INVENTOR.
BILL S. BURRUS

LIQUID LEVEL DETECTOR

BACKGROUND OF THE INVENTION

1. Field of the Invention

This invention relates to liquid level detection in subsea tanks. More particularly, the invention relates to calibration, inspection, repair and replacement of level detectors without interruption of the normal functioning of the tank.

2. Description of the Prior Art

The large subsea storage tank for oil well production is arriving on the scene. The "inverted wine glass" tank of Chicago Bridge and Iron is in operation. Other designs are being engineered and proposed to the oil industry throughout the world.

Among the many problems of filling the subsea tank, holding production within it and removing production from it is the problem of determining where the level of oil is in the tank at any predetermined time. In general, an open-bottomed tube can be mounted through the upper portion of the tank to extend below the vertical range of the interface of oil and water within the tank. With the tube open at its bottom and communicated with the stored oil at its top, the interface within the tube will match the interface within the tank. A primary element is mounted in the tube to sense the interface. However, with the ambient conditions of the tank being the hostile environment of the sea, it is not obvious how the primary element can be calibrated, removed and replaced.

SUMMARY OF THE INVENTION

It is an object of the invention to first fill the tube with oil and then water to calibrate a primary element responsive to both fluids.

Another object is to remove all oil from the tube while the end of the tube is below the interface so the top of the tube may be opened to remove the primary element for repair, inspection and replacement.

The present invention contemplates a subsea tank for oil well production therein forming an interface with sea water. A tube, open at its bottom, is extended through the upper part of the tank to below the oil-water interface. A detector of the interface is mounted within the tube. A valved connection between the upper part of the tank and the upper part of the tube permits the interface within the tank to be followed by the interface within the tube. The top of the tube is sealed from the sea. Pumping is provided from the upper portion of the tube to fill the tube with oil for exposure of the primary element to only oil. A vent for the oil is provided from the upper portion of the tube to enable the water to evacuate the tube of oil for exposure of the primary element to only water.

Other objects, advantages and features of this invention will become apparent to one skilled in the art upon consideration of the written specification, appended claims, and attached drawing, wherein;

The drawing is a sectioned elevation of a portion of the upper part of a subsea tank with a tube mounted through the tank roof and the primary element of a liquid level detector, all embodying the present invention.

DESCRIPTION OF THE PREFERRED EMBODIMENT OF THE INVENTION

A subsea tank is not fully disclosed in the drawing, only the roof 1 of the tank and the interface 2 of the oil and water therein. Tube 3 is connected permanently through the roof, extending down to below the expected vertical range of the interface.

The tube 3 is open at 4 and sealed at 5. A capacitance probe in the form of an elongated member is mounted to depend from a pad, or plate 7. Centralizing spacers 8 are mounted on the member to keep it a consistent distance from the tube walls. A weight keeps the elongated, thin, fragile member under tension. A circuit, responsive to the capacitance between member 6 and the walls of tube 3, is contained in box 9 to manifest the interface location.

The probe 6 can be a rod or a cable in form. The basic requirement of form is that it extend its uniform length substantially the length of the tube. In this position, and with this form, it comprises one plate of a capacitor.

With the disclosed arrangement, there will be maintained a capacitance value between the probe 6 and the wall of tube 3 which will depend upon the relative amounts of oil and water in the tube. The circuit of box 9 will respond to the changes in capacitance value and indicate, or display, each value as the height of the interface 2.

Other forms of primary elements could conceivably be substituted for probe 6. However, regardless of what primary element is mounted in tube 3, the problem of calibrating, cleaning, repair and replacement exists.

Conduit 10 is connected to the upper portion of tube 3 and the upper portion of tank 1. When valve 11 is open, this connection permits the exchange of oil between tank and tube to maintain identical interface heights in tank and tube.

Conduit 12 is also connected to the upper part of the tube 3 and is extended upward from the tank. A pump 13 is provided for connection to conduit 12.

Although the pump 13 could be at a subsea location, or at the surface, it is disclosed here as somewhere above the tank and near a storage vessel 14. Valve 15 is in a bypass around the pump to enable oil to flow directly from the tube to storage.

The function of the pump, bypass valve 15 and storage 14 is to provide for oil and water to alternatively be placed in tube 3 for calibration of the primary element. The precise location of pump and storage is not a limiting factor. They can be temporarily connected to conduit 12 from the surface or placed at a subsurface location and connected to tube 3.

In all events, conduit 12 is valved by 16, opened. The vertical height of conduit 12 and location of storage 14 provides the head which will enable the sea water to push all oil from tube 3, leaving only sea water therein for calibration purposes. Valve 17 and valve 11 are closed during this oil-evacuation.

Alternatively, pump 13 can be used to force oil from storage 14 down until tube 3 is filled. Bypass valve 15 is closed and valve 16 is opened during this pumping of oil into tube 3. The primary element is calibrated with tube 3 full of oil.

During such time as tube 3 contains oil, valved conduit 18 functions to remove gas which may be evolved and collected in the upper part of tube 3 and which would render the interface inaccurate. Conduit 18 is provided with sufficient valving to dispose of any gas evolved.

From the foregoing it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

The invention, having been described, what is claimed is:

1. A level detector including calibrating means for the oil-water interface in a subsea storage tank, including,
    an open-bottomed tube mounted on the tank to extend over the expected range of interface variation within the tank,
    a primary element extended down into the tube to respond to the interface over its range,
    a first valved conduit connected between the upper portion of the tube and the oil stored within the tank,
    a second valved conduit connected to the upper portion of the tube,
    a storage tank connected to the second conduit and positioned high enough above the tube for the sea water to lift oil from within the tube into the storage tank for calibration with the tube filled with water, and a pump connected to the second conduit and tank to force oil from the storage into the full length of the tube for calibration with the tube filled with oil.

2. The detector and calibration means of claim 1 including, manifesting means connected to the primary element for display of the interface location within the tank and mounted on a sealing structure for the top of the tube.

3. The detector and calibration means of claim 1 including, a third valved conduit connected to the upper portion of the tube at a location where gas is removed from the tube to obviate it affecting the interface in the tube.

* * * * *